US 6,659,712 B2

(12) United States Patent
Brooks et al.

(10) Patent No.: US 6,659,712 B2
(45) Date of Patent: Dec. 9, 2003

(54) APPARATUS AND METHOD FOR DETECTING A DAMAGED ROTARY MACHINE AEROFOIL

(75) Inventors: Richard V Brooks, Derby (GB); Arthur L Rowe, Derby (GB); Michael A Horswill, Chester (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/173,116

(22) Filed: Jun. 18, 2002

(65) Prior Publication Data
US 2003/0007861 A1 Jan. 9, 2003

(30) Foreign Application Priority Data
Jul. 3, 2001 (GB) .............................................. 0116193

(51) Int. Cl.[7] .............................................. F01D 21/14
(52) U.S. Cl. .......................................... 415/1; 415/118
(58) Field of Search ............................ 415/1, 30, 118; 416/38, 42, 61; 73/116

(56) References Cited
U.S. PATENT DOCUMENTS
4,479,115 A  * 10/1984 Holzhauer .................. 340/611
5,479,818 A  *  1/1996 Walter et al. ................. 73/116
5,552,711 A  *  9/1996 Deegan et al. ............... 324/464

FOREIGN PATENT DOCUMENTS
EP        0 385 912 A        9/1990

* cited by examiner

Primary Examiner—Ninh H. Nguyen
(74) Attorney, Agent, or Firm—W. Warren Taltavull; Manelli, Denison & Selter PLLC

(57) ABSTRACT

A gas turbine engine (10) comprises a fan rotor (26) having a plurality of fan blades (24) and an apparatus (34) for detecting damage to the fan blades (24). The apparatus (34) comprises a transducer (36) arranged to detect the pressure in the gas flow around the fan blades (34) and to produce a pressure signal. A speed sensor (48) is arranged to measure the speed of rotation of the fan rotor (26) and to produce a speed signal. A processor unit (40) analyses the pressure signal and the speed signal to detect changes in the amplitude of the pressure signal, which occur at multiples of the rotational frequency of the fan rotor (24). The changes indicate differences in pressure between the gas flow around a damaged fan blade (24) and the gas flow around the remainder of the fan blades (24). The processor unit (40) sends a signal indicative of damage to a fan blade (24), if the difference in pressure is above the predetermined level, to an indicator device (44, 46).

28 Claims, 3 Drawing Sheets

APPARATUS AND METHOD FOR DETECTING A DAMAGED ROTARY MACHINE AEROFOIL The present invention relates to an apparatus and method for detecting a damaged aerofoil, in particular for detecting a damaged gas turbine engine fan blade, a gas turbine engine compressor blade, a gas turbine engine turbine blade, a gas turbine engine fan outlet guide vane, a gas turbine engine compressor vane or a gas turbine engine turbine vane.

Gas turbine engines, particularly on aircraft, are susceptible to objects entering the gas turbine engine. These objects may be relatively soft objects, for example birds, or relatively hard objects, for example stones. The majority of hard objects entering a gas turbine engine are relatively small and produce localised damage to the gas turbine engine blades, for example relatively small dents or nicks. Some of the soft objects entering the gas turbine engine frequently produce no damage to the gas turbine engine blades. However, some relatively large soft objects, for example birds, entering the gas turbine engine produce widespread damage to the gas turbine engine blades.

Gas turbine engine blades may also suffer damage, on very rare occasions, by colliding with other blades or vanes in an adjacent row of blades or an adjacent row of vanes. The collision with other blades, or vanes, may result in widespread damage to the gas turbine engine blades or gas turbine engine vanes.

It is highly desirable to detect widespread damage to a gas turbine engine blade or a gas turbine engine vane before it causes failures.

Gas turbine engine blades are periodically inspected for damage. If a damaged gas turbine engine blade is detected it is replaced, or repaired, as required. In the case of gas turbine engines provided on aircraft, the gas turbine engines are visually inspected prior to each flight. However, these pre-flight inspections often take place under difficult circumstances and damaged gas turbine engine blades may not always be detected by the pre-flight inspection.

Accordingly the present invention seeks to provide a novel apparatus and method for detecting widespread damage to one or more aerofoils of a set of aerofoils which may not have been detected by pre-use inspection.

Accordingly the present invention seeks to provide a novel apparatus and method for detecting widespread damage to one or more aerofoils of a set of aerofoils while the aerofoils are in operation.

Accordingly the present invention provides a rotary machine comprising a plurality of aerofoils arranged in a set, an apparatus for detecting damage to at least one of the aerofoils in the set, the apparatus for detecting damage to at least one of the aerofoils in the set comprising at least one pressure transducer arranged to detect the pressure in the fluid flow around the aerofoils in the set and to produce a pressure signal corresponding to said pressure, a processor unit arranged to analyse the pressure signal to determine if the difference in pressure between the fluid flow around at least one of the aerofoils in the set and the fluid flow around the remainder of the aerofoils in the set is above a predetermined level, the processor unit is arranged to produce a signal indicative of damage to at least one of the aerofoils in the set if the difference in pressure is above the predetermined level and to send the signal to an indicator device.

Preferably the machine comprises a rotor and a stator, the aerofoils are rotor blades mounted on the rotor and the at least one pressure transducer is mounted on the stator.

Alternatively the machine comprises a rotor and a stator, the aerofoils may be stator vanes mounted on the stator and the at least one pressure transducer is mounted on the rotor.

The rotor blades may be gas turbine engine fan blades or gas turbine engine compressor blades.

The stator vanes may be gas turbine engine fan outlet guide vanes or gas turbine engine compressor vanes.

Preferably a speed sensor is arranged to detect the speed of rotation of the rotor and to produce a speed signal corresponding to said speed, the processor unit being arranged to analyse the speed signal to determine the rotational frequency of the rotor, the processor unit being arranged to analyse the pressure signals and the rotational frequency of the rotor to detect changes in the amplitude of the pressure which occur at the same frequency as, or at multiples of the rotational frequency of, the rotational frequency of the rotor.

The pressure transducer may have a low pass mechanical sensitivity to detect low frequency fluctuations in pressure.

Alternatively a low pass electrical filter may be arranged to filter the pressure signal before it is analysed by the processor unit.

Alternatively a low pass acoustic filter may be arranged to filter the pressure in the gas flow around the All blades before it is detected by the pressure transducer.

Alternatively the processor unit may have means to sample the pressure signal at high frequency and means to perform a Fourier transformation.

The at least one pressure transducer may be arranged upstream of the aerofoils or downstream of the aerofoils.

Preferably a casing is arranged around the rotor blades and the casing partially defines a duct in which the rotor blades rotate.

Preferably the at least one pressure transducer is arranged in the casing.

Alternatively the at least one pressure transducer is arranged in the duct.

The present invention also provides a method of detecting damage to a rotary machine aerofoil, the machine comprising a plurality of aerofoils arranged in a set, the method comprising detecting the pressure in the fluid flow around the aerofoils in the set and producing a pressure signal corresponding to said pressure, analysing the pressure signal to determine if the difference in pressure between the fluid flow around at least one of the aerofoils in the set and the gas flow around the remainder of the aerofoils in the set is above a predetermined level, producing a signal indicative of damage to at least one of the aerofoils in the set if the difference in pressure is above the predetermined level and sending the signal to an indicator device.

Preferably the machine comprises a rotor and a stator, the aerofoils are rotor blades mounted on the rotor and the at least one pressure transducer is mounted on the stator.

Alternatively the machine comprises a rotor and a stator, the aerofoils may be stator vanes mounted on the stator and the at least one pressure transducer is mounted on the rotor.

Preferably the rotor blades are gas turbine engine fan blades or gas turbine engine compressor blades, the method comprising detecting the pressure in the fluid flow around the fan blades or detecting the pressure in the fluid flow around the compressor blades.

Alternatively the stator vanes are gas turbine engine fan outlet guide vanes or gas turbine engine compressor vanes, the method comprising detecting the pressure in the fluid flow around the fan outlet guide vanes or detecting the pressure in the fluid flow around the compressor vanes.

Preferably the method comprises measuring the speed of rotation of the rotor, analysing the speed of rotation of the rotor to determine the rotational frequency of the rotor, analysing the pressure signals and the rotational frequency to detect changes in the amplitude of the pressure which occur at the same frequency as, or at multiples of the rotational frequency of, the rotational frequency of the rotor.

The method may comprise detecting low frequency fluctuations in pressure.

Alternatively the method may comprise filtering the pressure signal before it is analysed using a low pass electrical filter.

Alternatively the method may comprise filtering the pressure in the gas flow around the rotor blades before it is detected using a low pass acoustic filter.

Alternatively the method may comprise sampling the pressure signal at high frequency and performing a Fourier transformation.

The method may comprise detecting the pressure upstream of the aerofoils or downstream of the aerofoils.

Preferably a casing is arranged around the rotor blades and the casing partially defines a duct in which the rotor blades rotate.

Preferably the method comprises detecting the pressure Fusing at least one pressure transducer arranged in the casing.

Alternatively the method comprises detecting the pressure using at least one pressure transducer arranged in the duct.

The present invention will be more fully described by way of example with reference to the accompanying drawings in which.

Figure 1:
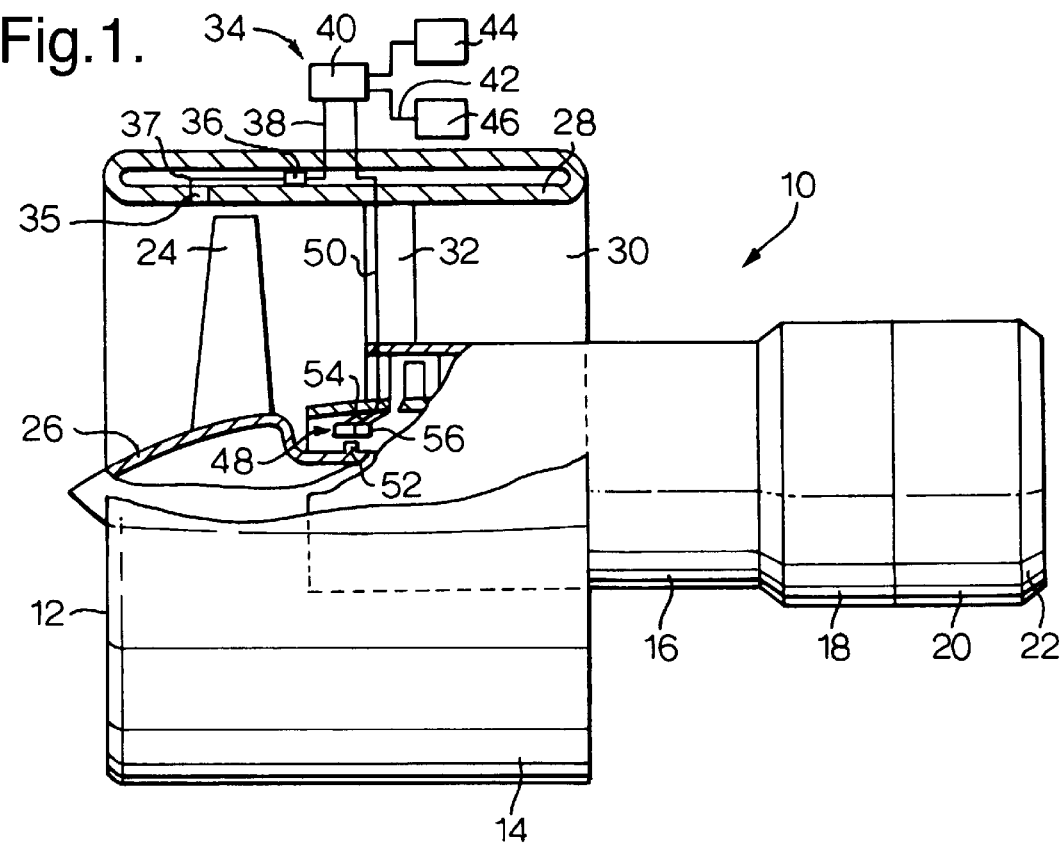
FIG. 1 is a partially cut away view of a turbofan gas turbine engine having an apparatus for detecting damage to a rotor blade according to the present invention.

A turbofan gas turbine engine 10, as shown in FIG. 1, comprises in axial flow series an inlet 12, a fan section 14, a compressor section 16, a combustion section 18, a turbine section 20 and an exhaust 22. The turbine section 20 is arranged to drive the fan section 14 and compressor section 16 via one or more shafts (not shown). The turbofan gas turbine engine 10 operates quite conventionally and its operation will not be discussed further.

The fan section 14 comprises a plurality of fan blades 24 secured to and extending radially from a fan rotor 26. The fan blades 24 are enclosed by a fan casing 28, which defines a fan duct 30, and the fan casing 28 is secured to the compressor casing by a plurality of radially extending fan outlet guide vanes 32.

It is known to make the fan blades 24 hollow so as to reduce the weight of the fan blades 24. It is also known to make these fan blades 24 by diffusion bonding, or diffusion brazing, a honeycomb core between two outer metallic sheets or by diffusion bonding and superplastically forming a metallic core sheet between two metallic outer sheets to define a hollow interior. It is also known to simply use two outer sheets to define a hollow interior. It is also known to use solid metallic fan blades 24 or composite fan blades 24.

As discussed previously there are instances when the impact of a large soft foreign object, a bird, produces widespread damage to one or more fan blades 24. The widespread damage to a fan blade 24 disrupts the airflow in the vicinity of the damaged fan blade 24. The disrupted airflow produces an increase in vibration, hence a reduction in working life of some of the fan blades 24, or even the compressor blades, and may even result in the failure of a fan blade 24, or compressor blades. The impact of a small hard foreign object, a stone, produces localised damage, for example nicks, dents or cracks, to one or more fan blades 24. The localised damage to a fan blade 24 does not disrupt the airflow in the vicinity of the damaged fan blade 24.

The present invention detects widespread damage to a turbomachine aerofoil by distinguishing between the acoustic signature of an undamaged set of aerofoils and the acoustic signature of a set of aerofoils with one or more aerofoils with widespread damage.

The acoustic signature of a set of aerofoils has frequency components relating to aerodynamic similarities and aerodynamic differences of the aerofoils in the set of aerofoils.

The frequency components relating to aerodynamic similarities occur at the frequency of relative rotation between the aerofoil set and the transducer multiplied by the number of aerofoils in the aerofoil set and also at multiples, or harmonics, of this fundamental frequency. These occur at significant pressure amplitudes for an undamaged set of aerofoils and for a set of aerofoils with one or more aerofoils with widespread damage.

The frequency components relating to aerodynamic differences occur at the frequency of relative rotation between the aerofoil set and the transducer and also at multiples, or harmonics, of the fundamental frequency. These occur at significant pressure amplitudes only with a set of aerofoils with an aerofoil with widespread damage.

Thus it is possible to distinguish between an undamaged set of aerofoils and a set of aerofoils with an aerofoil with widespread damage by determining the pressure amplitude of the frequency components relating only to aerodynamic differences. These frequency components exclude the frequency components relating simultaneously to aerodynamic similarities and differences.

Widespread damage to more than one aerofoil in a set of aerofoils is detected similarly. However, the fundamental frequency may be less significant, thus placing greater reliance on the harmonic frequencies.

The gas turbine engine 10 is provided with an apparatus 34 for detecting widespread damage to the fan blades 24 and is not capable of detecting localised damage to the fan blades 24.

The apparatus 34 for detecting widespread damage to the fan blades 24 comprises one or more pressure transducers 36 arranged to detect the pressure of the gas flow around the fan blades 24 in the set of fan blades, one or more speed sensors 48 to measure the speed of rotation of the fan rotor 26 and the set of fan blades, a processor 40 and one or more indicator devices 42 and 44 to provide an indication of whether one or more of the fan blades 24 in the set of fan blades is damaged.

Each pressure transducer 36 is arranged in the fan casing 28 and is supplied with gas from the fan duct 30 by a respective duct 37. Each duct 37 has an opening 35 through the fan casing 28 into the fan duct 30. Each of the openings 35, in this example, is positioned upstream of the fan blades 24. Each duct 37 is arranged to form a low pass acoustic filter for the pressure in the fan duct 30. Each pressure transducer 36 sends a pressure signal corresponding to the detected pressure to a processor unit 40 via an electrical lead 38.

Each speed sensor 48 is arranged to send a signal indicative of the speed of the fan rotor 26 and fan blade set to the processor unit 40 via electrical lead 50. Each speed sensor 48 comprises for example a phonic wheel 52 on the fan rotor 26 and a variable reluctance speed probe 54 on static structure 56 connected to the fan outlet guide vanes 32.

The processor unit 40 is arranged to analyse the signal indicative of the speed of rotation of the fan rotor 26 and fan blade set to determine the rotational frequency of the fan rotor 26. The processor unit 40 is arranged to analyse the pressure signal to determine if the difference in the pressure between the gas flow around at least one of the fan blades 24 and the gas flow around the remainder of the fan blades 24 in the fan blade 24 set is above a predetermined level. In particular the processor unit 40 analyses the pressure signal by looking for differences in the pressure signal amplitude at the rotational frequency, or multiples of the rotational frequency, of the fan rotor 26 and set of fan blades.

The processor unit 40 is arranged to produce a signal indicative of widespread damage to at least one of the fan blades 24 if the difference in pressure is above the predetermined level. The processor unit 40 sends the signal to the indicator device 44 or the indicator device 46 via electrical leads 42. The indicator device 44 is an audible alarm and the indicator device 46 is a visual alarm. The indicator devices 44 and 46 are placed in the aircraft cockpit to warn the pilot that widespread damage has occurred to one or more of the fan blades 24 and that the fan blades 24 require checking, replacing or repairing.

Figure 3:
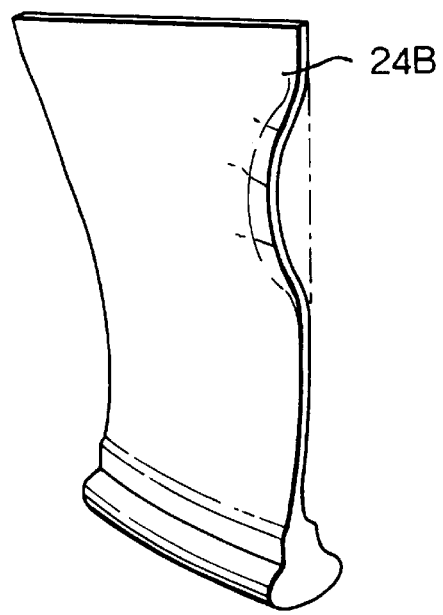
FIG. 3 shows a perspective view of a damaged rotor blade.

As mentioned previously if a fan blade 24 has widespread damage, as shown for example in FIG. 3, the damaged fan blade 24A disrupts the airflow in the vicinity of the damaged fan blade 24A. The disrupted airflow around the damaged fan blade 24A distorts the pressure field around the damaged fan blade 24A. As the fan rotor 26 rotates, the distorted pressure field around the damaged fan blade 24A rotates around the fan duct 28 at the same speed as the fan rotor 26. The distorted pressure field is seen in the non-rotating frame at a number of frequencies, in particular at the rotational frequency of the fan rotor 24 and at multiples of the rotational frequency of the fan rotor 24.

The distorted pressure field around the damaged fan blade 24A is detected by each of the pressure transducers 36 as the damaged fan blade 24A passes the respective pressure transducer 36. The distorted pressure field around the damaged fan blade 24A extends a considerable distance upstream and downstream of the damaged fan blade 24A. Hence the pressure transducers 36 do not need to be positioned very close to the fan blades 24. The pressure transducers 36 may measure the static pressure or the total pressure. The pressure transducers 36 may be positioned upstream or downstream of the fan blades 24.

The processor unit 40 samples the pressure signals from the pressure transducers 36 and analyses the pressure signals to detect differences in the amplitude of the pressure which occur at the same frequency as the rotational frequency of the fan rotor 26 or at multiples of the rotational frequency of the fan rotor 26. Thus the processor unit 40 distinguishes between a pressure signal frequency content of a fan rotor 26 with one or more damaged fan blades 24A and a pressure signal frequency content of a fan rotor 26 with no damaged fan blades 24. The pressure signal from a fan rotor 26 with one or more damaged fan blades 24A has significant pressure signal amplitudes at the frequency of rotation, and at multiples of the frequency of rotation, of the fan rotor 26. However, the pressure signal amplitude from a fan rotor 26 with a plurality of damaged fan blades 24A may not have a significant pressure signal amplitude at the rotational frequency of the fan rotor 26. In this case the pressure signal amplitude from a fan rotor 26 with a plurality of damaged fan blades 24A has a significant pressure signal amplitude at multiples of the rotational frequency of the fan rotor 26. In contrast the pressure signal from a fan rotor 26 with no damaged fan blades 24 has pressure signal amplitude at any frequency associated with noise.

The significant pressure signal amplitudes at the rotational frequency of the fan rotor 26 are caused by the distorted airflow around the damaged fan blade 24A being different to the airflow around the undamaged fan blades 24. This difference in airflow occurs once every revolution of the fan rotor 26 and produces the frequency, and multiples of the frequency, of the rotational frequency of the fan rotor 26. In addition, the individual fan blades 24 produce significant pressure signal amplitudes at the frequency, and multiples of the frequency, of the rotational frequency of the fan rotor 26 multiplied by the number of fan blades 24 on the fan rotor 26 for both damaged and undamaged fan blades 24.

The processor unit 40 is arranged to differentiate between increases in amplitude of the pressure due to damage to the fan blade 24 and other causes, for example changes in pressure due to altitude. The processor unit 40 is also arranged to differentiate between increases in amplitude of the pressure due to damage to the fan blade 24 and transient events. Transient events comprise for example intake distortion due to crosswind, lightning strike near the aircraft, fan stall, engine surge, bird impact or ice impact which causes no damage to the fan blades 24. In the transient events the amplitude of the pressure returns to normal after a short period of time, thus the processor unit 40 is arranged to indicate damage to the fan blade 24 if the predetermined pressure difference is maintained for a predetermined period of time. Rain or hail may produce an increase in the amplitude of the pressure for longer periods of time. To compensate for rain or hail, the processor unit 40 is arranged to compare the change in amplitude of the pressure at multiples of the rotational frequency of the fan rotor 26 with the change in amplitude of the pressure at other frequencies.

In order for the processor unit 40 to differentiate between a fan rotor 26 with damaged fan blades 24 and a fan rotor 26 with undamaged fan blades 24 the frequency content of the pressure signal is limited to those frequencies that may be accommodated by the sampling frequency of the processor unit 40. This is necessary to avoid aliasing, or shifting, of the higher frequencies, such as those produced by the individual fan blades, to the lower frequencies. This may be achieved by arranging the duct 37 to act as a low pass acoustic filter between the fan duct 30 and the pressure transducer 36. Alternatively the pressure transducer may have a low pass mechanical sensitivity such that it is responsive to low frequencies and unresponsive to high frequencies. Alternatively a low pass electrical filter may be provided between the pressure transducer 36 and the processor unit 40.

If the processor unit 40 is unable to sample the pressure signal at a frequency sufficiently high to adequately capture the frequencies relating to the aerodynamic differences between a fan rotor 26 with damaged fan blades 24 and a fan rotor 26 with undamaged fan blades 24 then differentiation between a fan rotor 26 with damaged fan blades 24 and a fan rotor 26 with undamaged fan blades 24 cannot be achieved based indirectly on these frequencies. However, the differentiation between a fan rotor 26 with damaged fan blades 24 and a fan rotor 26 with undamaged fan blades 24 may be achieved based indirectly on these frequencies, because the aliasing, or shifting, of higher frequencies to lower frequencies may be determined.

The processor unit 40 may, directly or indirectly, determine the pressure amplitude of the frequencies relating only to aerodynamic differences between a fan rotor 26 with damaged fan blades 24 and a fan rotor 26 with undamaged fan blades 24 by performing a time to frequency transformation, or Fourier transformation, or by performing band pass filtering.

The processor may also, directly or indirectly, determine the pressure amplitude of the frequencies relating to aerodynamic differences between a fan rotor 26 with damaged fan blades 24 and a fan rotor 26 with undamaged fan blades 24 from the pressure signal by measuring the peak to peak difference in the pressure signal. This relies on the frequencies relating to aerodynamic similarities being filtered out before the pressure signal is sampled.

EXAMPLE

Figure 4:
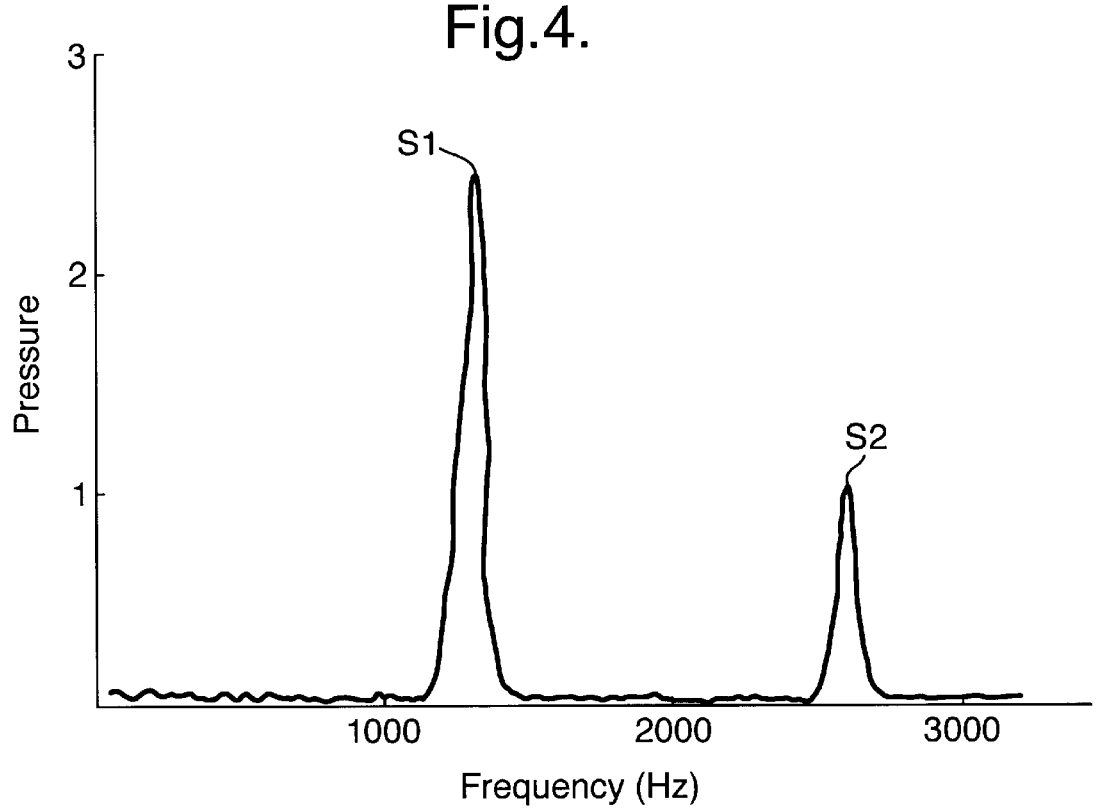
FIG. 4 is a graph showing the amplitude of the pressure signal for frequencies up to 3000 Hz for an undamaged set of rotor blades.
Figure 5:
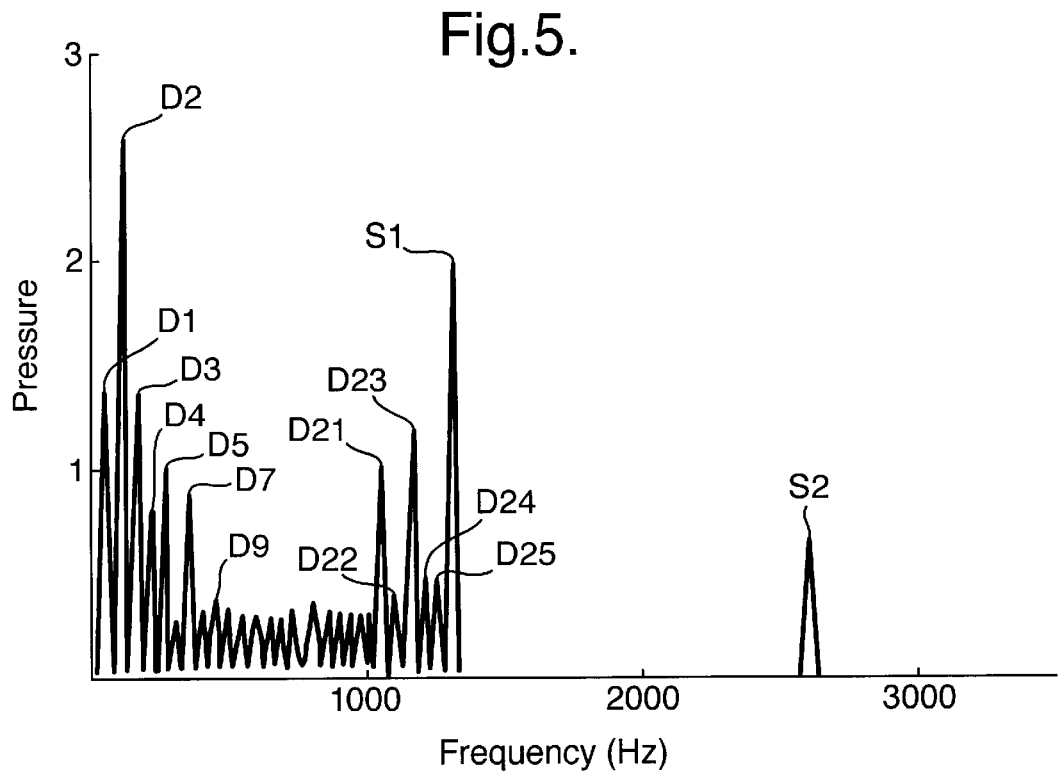
FIG. 5 is a graph showing the amplitude of the pressure signal for frequencies up to 3000 Hz for a set of rotor blades with one rotor blade with widespread damage.
Figure 6:
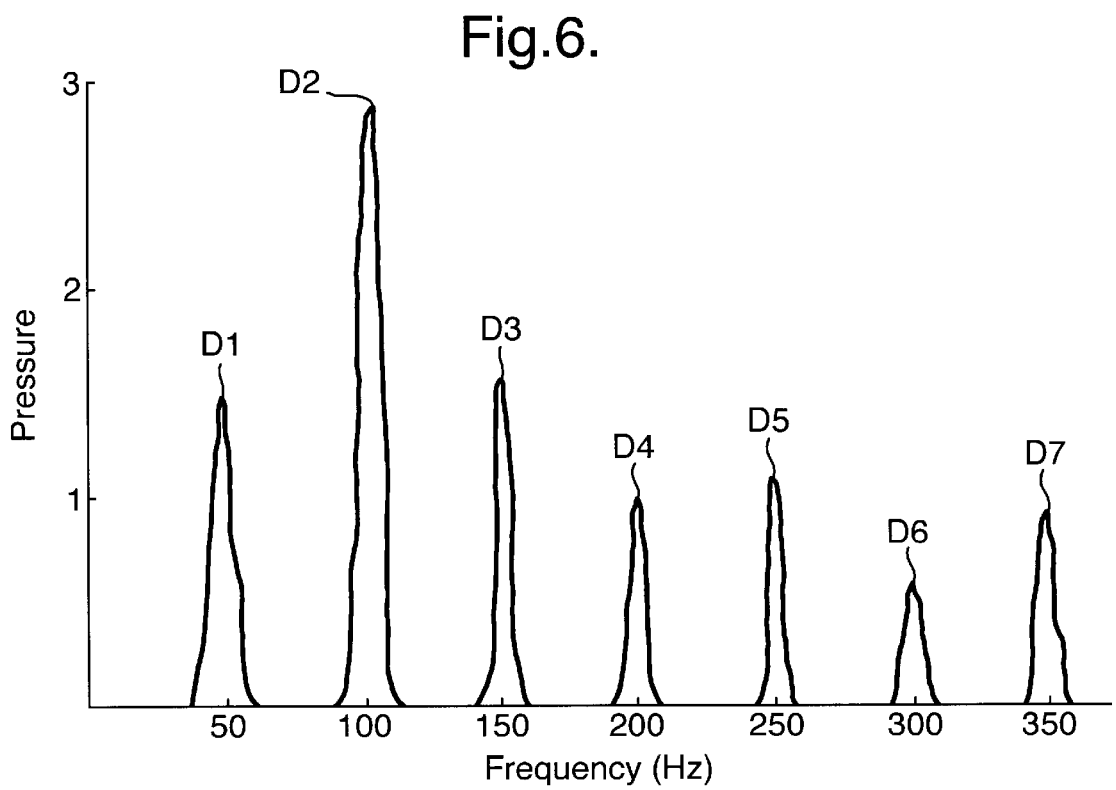
FIG. 6 is an enlargement of the graph in FIG. 5 showing the amplitude of the pressure signal for frequencies up to 500 Hz.

A microphone was placed in the fan duct of the gas turbine engine upstream of the fan rotor. The fan rotor was rotated at a speed of 3000 rpm. A speed of 3000 rpm equates to a rotational frequency of 50 Hz. The measured amplitude of the pressure signal at a frequency of 50 Hz was 0.07 pounds per square inch (482 Pa) for a fan rotor with undamaged fan blades, as shown in FIG. 4. The measured amplitude of the pressure signal at a frequency of 100 Hz was about 0.1 pounds per square inch (689 Pa). In a bird ingestion test a number of birds were directed into the inlet of the gas turbine engine and produced damage to one or more fan blades on the fan rotor. The measured amplitude of the pressure signal at a frequency of 50 Hz was 1.4 pounds per square inch (9653 Pa) for a fan rotor with one or more damaged fan blades, as shown in FIGS. 5 and 6. The measured amplitude of the pressure signal at a frequency of 100 Hz was 2.5 pounds per square inch (17236 Pa) for a fan rotor with one or more damaged fan blades, as shown in FIGS. 5 and 6.

FIGS. 5 and 6 clearly shows that there is an increase in amplitude at all multiples of the rotational frequency of the fan rotor when there is damage to one or more fan blades, as shown by peaks D1 to D25. There are further peaks, not shown, above 1300 Hz. However, it is necessary to ignore disregard those frequencies where a harmonic of the frequency of rotation of the fan rotor is equivalent to a harmonic of the frequency of rotation of the fan rotor multiplied by the number of blades. In this case there are 26 fan blades and it can be seen, from FIGS. 4 and 5, that there are pressure signal peaks S1 and S2 at 1300 Hz and 2600 Hz corresponding to harmonics of the frequency of rotation multiplied by the number of fan blades. These also correspond to harmonics of the frequency of rotation of the fan rotor. Thus the pressure amplitude of the frequency components which are simultaneously a harmonic of the frequency of rotation of the fan rotor and a harmonic of the frequency of rotation of the fan rotor multiplied by the number of fan blades are not used to detect widespread damage to the fan blades.

Figure 2:
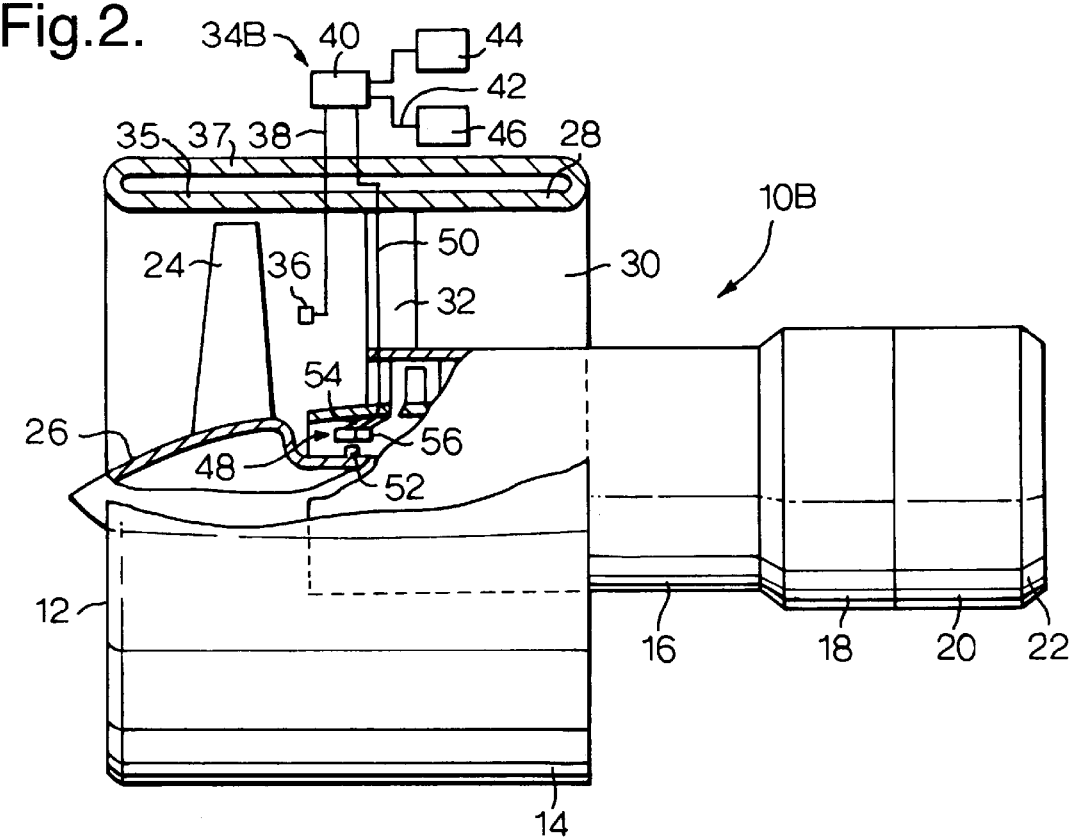
FIG. 2 is a partially cut away view of a turbofan gas turbine engine having a further apparatus for detecting damage to a rotor blade according to the present invention.

A gas turbine engine 10B, as shown in FIG. 2, is provided with an apparatus 34B for detecting damage to the fan blades 24.

The apparatus 34B for detecting widespread damage to the fan blades 24 comprises one or more pressure transducers 36 arranged to detect the pressure of the gas flow around the fan blades 24 in the set of fan blades, one or more speed sensors 48 to measure the speed of rotation of the fan rotor 26 and the set of fan blades, a processor 40 and one or more indicator devices 42 and 44 to provide an indication of whether one or more of the fan blades 24 in the set of fan blades is damaged.

Each pressure transducer 36 is arranged in the fan casing 28, downstream of the fan blades 24, on a member extending into the fan duct 30. Each pressure transducer 36 sends a pressure signal corresponding to the detected pressure to a processor unit 40 via an electrical lead 38.

Each speed sensor 48 is arranged to send a signal indicative of the speed of the fan rotor 26 and fan blade set to the processor unit 40 via electrical lead 50. Each speed sensor 48 comprises for example a phonic wheel 52 on the fan rotor 26 and a variable reluctance speed probe 54 on static structure 56 connected to the fan outlet guide vanes 32.

The processor unit 40 is arranged to analyse the signal indicative of the speed of rotation of the fan rotor 26 and fan blade set to determine the rotational frequency of the fan rotor 26. The processor unit 40 is arranged to analyse the pressure signal to determine if the difference in the pressure between the gas flow around at least one of the fan blades 24 and the gas flow around the remainder of the fan blades 24 in the fan blade 24 set is above a predetermined level. In particular the processor unit 40 analyses the pressure signal by looking for differences in the pressure signal amplitude at the rotational frequency, or multiples of the rotational frequency, of the fan rotor 26 and set of fan blades.

The processor unit 40 is arranged to produce a signal indicative of widespread damage to at least one of the fan blades 24 if the difference in pressure is above the predetermined level. The processor unit 40 sends the signal to the indicator device 44 or the indicator device 46 via electrical leads 42. The indicator device 44 is an audible alarm and the indicator device 46 is a visual alarm. The indicator devices 44 and 46 are placed in the aircraft cockpit to warn the pilot that widespread damage has occurred to one or more of the fan blades 24 and that the fan blades 24 require checking, replacing or repairing.

Although the invention has been described with reference to detecting damage to a fan blade, it is equally applicable to detecting damage to a compressor blade or a turbine blade.

Although the invention has been described with reference to detecting damage to rotor blades it is equally applicable to detecting damage to stator vanes, for example fan outlet guide vanes, compressor vanes or turbine vanes. However, in that instance the pressure transducer is located on a rotor positioned upstream or downstream of the stator vanes.

Although the invention has been described with reference to detecting damage to gas turbine engine rotor blades and stator vanes it is equally applicable to detecting damage to rotor blades and stator vanes of other turbomachines, for example steam turbines, or for detecting damage to water turbines, aircraft propellers, water propellers, windmills, wind turbines or cooling fans. In the present application the term aerofoil means a stator vane, or a rotor blade, of a rotary machine designed to operate in, to act on or to be acted upon by a fluid. The fluid may be a gas, for example air, or a liquid, for example water.

Although the invention has been described with reference to the use of a phonic wheel and a variable reluctance motor to measure the speed of rotation of the rotor, other suitable means for measuring the speed of rotation of the rotor may be used.

Although the invention has been described with reference to the use of a microphone to detect the pressure around the rotor blades, other suitable pressure transducers may be used, for example piezoelectric transducers etc.

The invention detects damage to one or more aerofoils in a set of substantially identical aerofoils.

We claim:

1. A rotary machine comprising a plurality of aerofoils arranged in a set, an apparatus for detecting damage to at least one of the aerofoils in the set, the apparatus for detecting damage to at least one of the aerofoils in the set comprising at least one pressure transducer arranged to detect the pressure in the fluid flow around the aerofoils in the set and to produce a pressure signal corresponding to said pressure, a processor unit arranged to analyse the pressure signal to determine if the difference in pressure between the fluid flow around at least one of the aerofoils in the set and the fluid flow around the remainder of the aerofoils in the set is above a predetermined level, the processor unit is arranged to produce a signal indicative of damage to at least one of the aerofoils in the set if the difference in pressure is above the predetermined level and to send the signal to an indicator device.

2. A rotary machine as claimed in claim 1 wherein the machine comprises a rotor and a stator, the aerofoils are rotor blades mounted on the rotor and the at least one pressure transducer is mounted on the stator.

3. A rotary machine as claimed in claim 2 wherein the rotor blades are gas turbine engine fan blades or gas turbine engine compressor blades.

4. A rotary machine as claimed in claim 2 wherein a speed sensor is arranged to detect the speed of rotation of the rotor and to produce a speed signal corresponding to said speed, the processor unit being arranged to analyse the speed signal to determine the rotational frequency of the rotor, the processor unit being arranged to analyse the pressure signals and the rotational frequency of the rotor to detect changes in the amplitude of the pressure which occur at the same frequency as, or at multiples of the rotational frequency of, the rotational frequency of the rotor.

5. A rotary machine as claimed in claim 2 wherein a casing is arranged around the rotor blades and the casing partially defines a duct in which the rotor blades rotate.

6. A rotary machine as claimed in claim 5 wherein the at least one pressure transducer is arranged in the casing.

7. A rotary machine as claimed in claim 5 wherein the at least one pressure transducer is arranged in the duct.

8. A rotary machine as claimed in claim 1 wherein the machine comprises a rotor and a stator, the aerofoils are stator vanes mounted on the stator and the at least one pressure transducer is mounted on the rotor.

9. A rotary machine as claimed in claim 8 wherein the stator vanes are gas turbine engine fan outlet guide vanes or gas turbine engine compressor vanes.

10. A rotary machine as claimed in claim 1 wherein the pressure transducer has a low pass mechanical sensitivity to detect low frequency fluctuations in pressure.

11. A rotary machine as claimed in claim 1 comprising a low pass electrical filter arranged to filter the pressure signal before it is analysed by the processor unit.

12. A rotary machine as claimed in claim 1 comprising a low pass acoustic filter arranged to filter the pressure in the gas flow around the aerofoils before it is detected by the pressure transducer.

13. A rotary machine as claimed in claim 1 wherein the processor unit has means to sample the pressure signal at high frequency and means to perform a Fourier transformation.

14. A rotary machine as claimed in claim 1 wherein the at least one pressure transducer is arranged upstream of the aerofoils or downstream of the aerofoils.

15. A method of detecting damage to a rotary machine aerofoil, the machine comprising a plurality of aerofoils arranged in a set, the method comprising detecting the pressure in the fluid flow around the aerofoils in the set and producing a pressure signal corresponding to said pressure, analysing the pressure signal to determine if the difference in pressure between the fluid flow around at least one of the aerofoils in the set and the gas flow around the remainder of the aerofoils in the set is above a predetermined level, producing a signal indicative of damage to at least one of the aerofoils in the set if the difference in pressure is above the predetermined level and sending the signal to an indicator device.

16. A method as claimed in claim 15 wherein the machine comprises a rotor and a stator, the aerofoils are rotor blades mounted on the rotor and the at least one pressure transducer is mounted on the stator.

17. A method as claimed in claim 16 wherein the rotor blades are gas turbine engine fan blades or gas turbine engine compressor blades, the method comprising detecting the pressure in the fluid flow around the fan blades or detecting the pressure in the fluid flow around the compressor blades.

18. A method as claimed in claim 16 comprising measuring the speed of rotation of the rotor, analysing the speed of rotation of the rotor to determine the rotational frequency of the rotor, analysing the pressure signals and the rotational frequency to detect changes in the amplitude of the static pressure which occur at the same frequency as, or at multiples of the rotational frequency of, the rotational frequency of the rotor.

19. A method as claimed in claim 16 wherein a casing is arranged around the rotor blades and the casing partially defines a duct in which the rotor blades rotate.

20. A method as claimed in claim 19 comprising detecting the pressure using at least one pressure transducer arranged in the casing.

21. A method as claimed in claim 19 comprising detecting the pressure using at least one pressure transducer arranged in the duct.

22. A method as claimed in claim 15 wherein the machine comprises a rotor and a stator, the aerofoils are stator vanes mounted on the stator and the at least one pressure transducer is mounted on the rotor.

23. A method as claimed in claim 22 wherein the stator vanes are gas turbine engine fan outlet guide vanes or gas turbine engine compressor vanes, the method comprising detecting the pressure in the fluid flow around the fan outlet guide vanes or detecting the pressure in the fluid flow around the compressor vanes.

24. A method as claimed in claim 15 comprising detecting low frequency fluctuations in pressure.

25. A method as claimed in claim 15 comprising filtering the pressure signal before it is analysed using a low pass electrical filter.

26. A method as claimed in claim 15 comprising filtering the pressure in the gas flow around the rotor blades before it is detected using a low pass acoustic filter.

27. A method as claimed in claim 15 comprising sampling the pressure signal at high frequency and performing a Fourier transformation.

28. A method as claimed in claim 15 comprising detecting the pressure upstream of the aerofoils or downstream of the aerofoils.

* * * * *